US007283726B2

(12) United States Patent
Yen

(10) Patent No.: US 7,283,726 B2
(45) Date of Patent: Oct. 16, 2007

(54) SYSTEM FOR PLAYING DVDS AND METHOD FOR CONTROLLING ANALOG TV SIGNAL OUTPUT THEREOF

(75) Inventor: Hsing Feng Yen, Taoyuan (TW)

(73) Assignee: Mitac Technology Corp., Hsin-chu Hsien ( * ) Notice: Subject to any disclaimer, the term of this patent is extended or adjusted under 35 U.S.C. 154(b) by 1114 days.

(21) Appl. No.: 10/262,716

(22) Filed: Oct. 1, 2002

(65) Prior Publication Data

US 2004/0062529 A1 Apr. 1, 2004

(51) Int. Cl.
*H04N 5/913* (2006.01)
*G06F 9/24* (2006.01)
*H04N 7/01* (2006.01)

(52) U.S. Cl. ............... 386/94; 386/126; 713/2
(58) Field of Classification Search ......... 386/126, 386/94, 124, 125; 348/552; 713/1, 2
See application file for complete search history.

(56) References Cited

U.S. PATENT DOCUMENTS

| 4,577,216 | A | * | 3/1986 | Ryan | ............ | 380/204 |
|---|---|---|---|---|---|---|
| 6,229,575 | B1 | * | 5/2001 | Vaughan et al. | ............ | 348/564 |
| 6,240,469 | B1 | * | 5/2001 | Ishibashi | ............ | 710/33 |
| 6,272,283 | B1 | * | 8/2001 | Nguyen | ............ | 386/94 |
| 6,356,704 | B1 | * | 3/2002 | Callway et al. | ............ | 386/94 |
| 6,370,318 | B1 | * | 4/2002 | Iwaki | ............ | 386/94 |
| 6,401,198 | B1 | * | 6/2002 | Harmer et al. | ............ | 713/1 |
| 7,058,284 | B2 | * | 6/2006 | Zou et al. | ............ | 386/94 |

FOREIGN PATENT DOCUMENTS

| JP | 11136622 A | * | 5/1999 |
|---|---|---|---|
| JP | 2000-123480 | | 4/2000 |
| JP | 2001-016538 | | 1/2001 |

* cited by examiner

*Primary Examiner*—Mehrdad Dastouri
*Assistant Examiner*—David N. Werner
(74) *Attorney, Agent, or Firm*—Ladas & Parry LLP

(57) ABSTRACT

A method for controlling analog TV signal output in a computer system. First, the analog TV signal output port is disabled when the computer system boots. A signal output control interface is provided to the DVD play device to control the analog TV signal output port. When the DVD play application is turned on, the analog TV signal output port is opened by the DVD play device through the signal output control interface. A signal protection procedure is driven simultaneously when the DVD play device starts. Before the DVD play device finishes, the analog TV signal output port is disabled by the signal output control interface and the DVD session is concluded.

6 Claims, 3 Drawing Sheets

SYSTEM FOR PLAYING DVDS AND METHOD FOR CONTROLLING ANALOG TV SIGNAL OUTPUT THEREOF

BACKGROUND OF THE INVENTION

1. Field of the Invention

The present invention relates to a method for controlling analog TV signal output and a computer system for playing DVDs with the above control method, so as to ensure application of protection technologies.

2. Description of the Related Art

With the rise of the digital image and multimedia, DVD players or DVD-ROMs are frequently integrated into personal computers, such as desktop or notebook. FIG. 1 is a schematic diagram showing the components of a DVD playing system in a computer system. Note that the other components of the computer system are omitted in FIG. 1 for concise illustration.

In FIG. 1, the DVD-ROM 10a is driven by DVD play application 10b to read the data from the DVD (not shown in FIG. 1). Thereafter, the data is processed by an image display control device 12a and displayed on the computer system (PC monitor 14) or a TV (not shown in FIG. 1) by outputting an analog TV signal to the TV via a TV signal output port 16.

The image display control device 12a may be a VGA (Video Graphics Array) control device with VGA control chip. In existing VGA control chips with TV output, image protection, such as that provided by Macrovision protection technologies, is also supported. Therefore, protection technology 12b is enabled when the DVD-ROM 10a is driven to read the DVD, thereby encode the analog TV signal to prevent infringement of the copyright.

However, protection technology is driven by the DVD play application. The DVD play application designed by vendors may be different. The DVD can be reproduced if the DVD play application is not started, and protection technology in the VGA control chip is not driven, since the analog TV signal is not encoded. Therefore, the computer system may be unable to protect copyrighted material.

SUMMARY OF THE INVENTION

It is therefore an object of the present invention to provide a method for controlling analog TV signal output and a computer system with a DVD play application, so as to ensure protection techniques are completely applied in computer systems. In the present invention, the analog TV signal is output only when the computer system plays the DVDs, and the signal is processed with protection technologies.

To achieve the above object, the present invention provides a method for controlling analog TV signal output and a computer system with a DVD play application. According to one embodiment of the invention, the method for controlling analog TV signal output in a computer system with a DVD play application is provided.

First, the analog TV signal output port is disabled when the computer system boots, thereby stopping all analog from being output.

A signal output control interface is provided in the DVD play application to control the analog TV signal output port. The signal output control interface may be a BIOS (Basic Input/Output System) interrupt in the computer system or a CMOS switch set up to control the analog TV signal output port according to predetermined procedures thereof.

When the DVD play application is turned on, the analog TV signal output port is opened by the DVD play application through the signal output control interface.

A signal protection technology is driven simultaneously when the DVD play application starts. Thus, the analog signal output through the analog TV signal output port can be protected by specific encoding.

Before the DVD play application finishes, the analog TV signal output port is disabled by the DVD play application through the signal output control interface and the DVD session is concluded.

According to another embodiment of the invention, the computer system with a DVD play application includes a DVD play device, an image display control device, an analog TV signal output port, and a signal output control interface.

The DVD play device reads and outputs data from the DVD. The image display control device may be a VGA control device to support a TV output function in the computer system, provide a signal protection procedure, and control displayed images.

The signal output control interface is provided to the DVD play device to control the analog TV signal output port. When the DVD play application is turned on, the analog TV signal output port is opened by the DVD play application through the signal output control interface.

When the DVD play application starts, the signal protection procedure is driven simultaneously. Before the DVD play application finishes, the analog TV signal output port is disabled by the DVD play application through the signal output control interface and the DVD session is concluded.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

Figure 1:
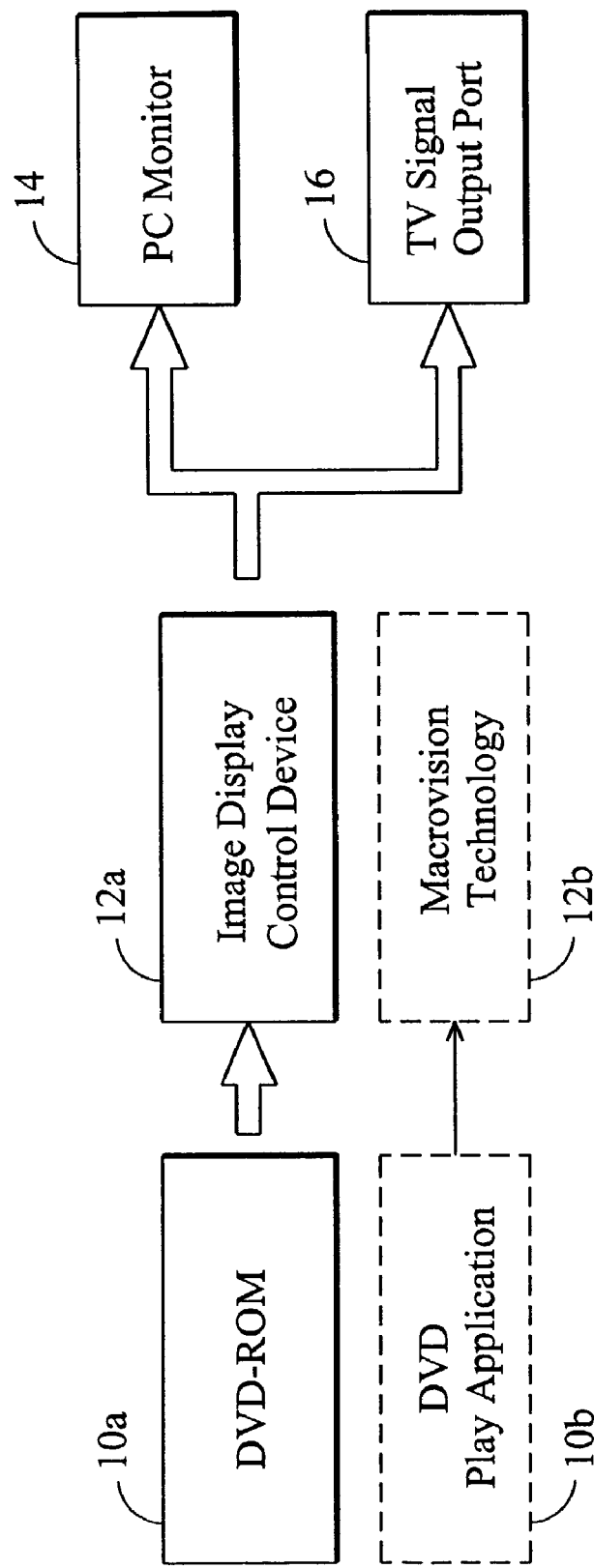
FIG. 1 is a schematic diagram showing the components of the DVD play application in the computer system.
Figure 2:
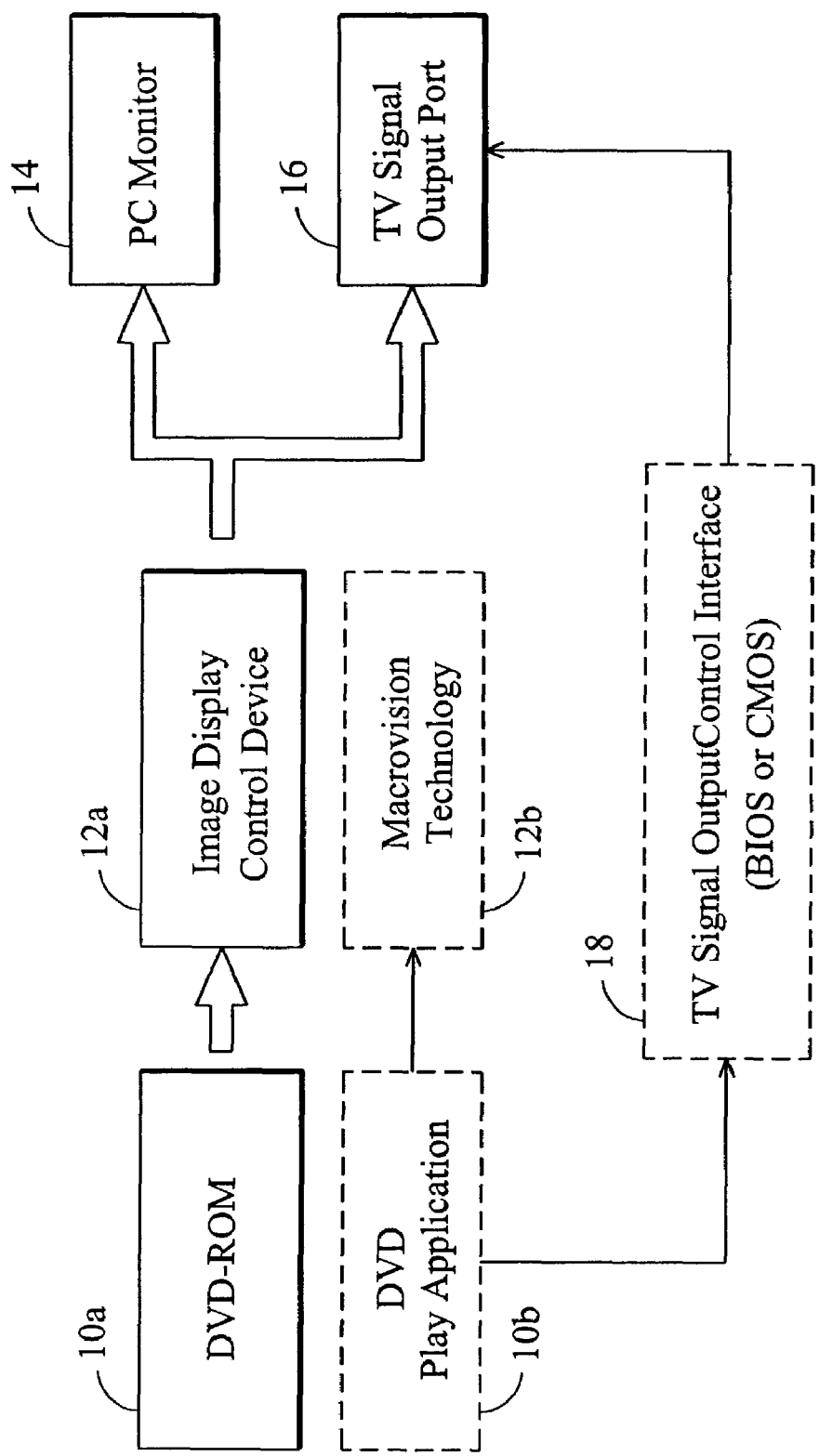
FIG. 2 is a schematic diagram showing the architecture of the computer system with a DVD play application according to the embodiment of the present invention.

FIG. 2 is a schematic diagram showing the architecture of the computer system with a DVD play application according to the embodiment of the present invention. It should be noted that similar components in FIG. 2 and FIG. 1 are labeled with the same symbol and numeral, and other components of the computer system are omitted in FIG. 2 for concise illustration.

As shown in FIG. 2, according to the embodiment of the invention, the computer system with a DVD play application includes a DVD play device 10a, an image display control device 12a, an analog TV signal output port 16, and a signal output control interface 18.

The DVD play device 10a is driven by DVD play application 10b to read data from the DVD. The image display control device 12a may be a VGA control device with a VGA control chip to support TV output in the computer system, provide protection technology procedure 12b, and control displayed images.

The signal output control interface 18 is provided to the DVD play device 10a to control the analog TV signal output port to 16. In this embodiment, the signal output control interface 18 may be a BIOS (Basic Input/Output System) interrupt in the computer system or a CMOS switch set up to control the analog TV signal output port according to predetermined procedures thereof.

The difference between the conventional system (FIG. 1) and the computer system according to the embodiment of the present invention (FIG. 2) is in the inventive provision of the additional signal output control interface 18 and the method for controlling analog TV signal output.

When the computer system is manufactured, the control procedure is programmed into the BIOS or CMOS of the computer system, such that the DVD play application can control the analog TV signal output port 16 by triggering an interrupt of the BIOS or setting the CMOS switch.

According to the embodiment of the invention, the method for controlling analog TV signal output in a computer system with a DVD play application is provided. The analog TV signal output port 16 is disabled when the computer system boots, thereby stopping all analog output.

The signal output control interface 18 is provided in the DVD play application (device) 10a to control the analog TV signal output port 16, that is, the analog TV signal output port 16 is controlled by the DVD play application 10a (or the DVD play application 10b). The signal output control interface 18 may be a BIOS interrupt in the computer system or a CMOS switch set up to control the analog TV signal output port according to predetermined procedures thereof.

Figure 3:
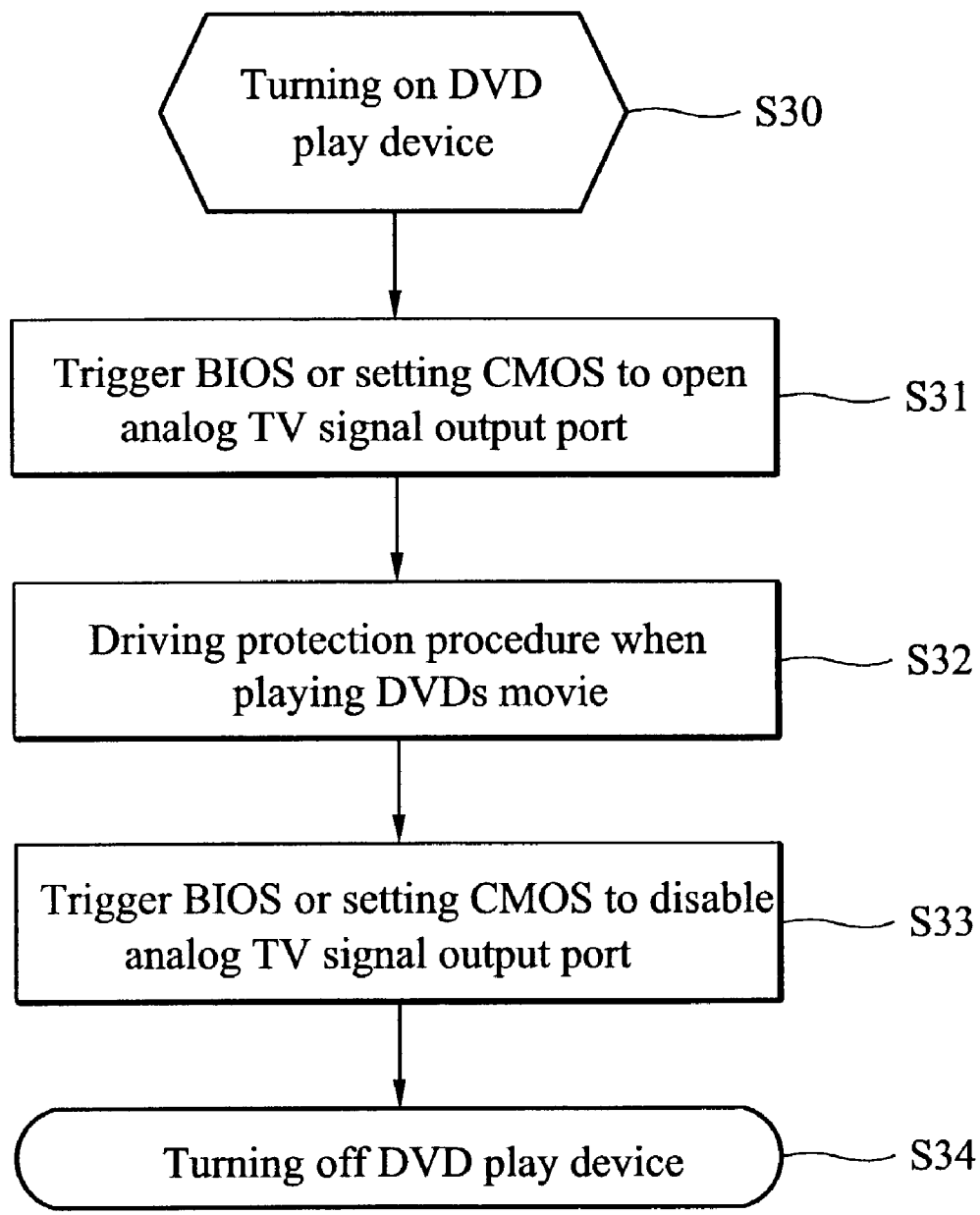
FIG. 3 is a flowchart illustrating the method for controlling analog TV signal output in a computer system according to the embodiment of the present invention.

FIG. 3 is a flowchart illustrating the method for controlling analog TV signal output in a computer system according to the embodiment of the present invention.

First, in step S30, the DVD play application 10a is turned on. Then, in step S31, the analog TV signal output port 16 is opened by the DVD play application 10a by triggering an interrupt of the BIOS or setting the CMOS switch (through the signal output control interface 18).

Then, in step S32, a DVD is played by the DVD play application 10a, and protection technology procedure 12b provided by the image display control device 12a is driven by the DVD play application 10b simultaneously.

The DVD play application 10a is driven by the DVD play application 10b to read the data from the DVD, and is then sent it to the PC monitor 14 of the computer system through the image display control device 12a, outputting the data encoded by protection technology procedure 12b to TV via the TV signal output port 16.

Before the DVD play application finishes, in step S33, the analog TV signal output port 16 is disabled by the DVD play application through the signal output control interface. Finally, in step S34, the DVD session is concluded and the DVD play application is turned off.

As a result, using the method of the present invention, the copyrights of DVDs can completely protect.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for controlling analog TV signal output in a computer system with a DVD play device, comprising the steps of:
   providing a signal output control interface to the DVD play device to control an analog TV signal output port of the computer system;
   booting the computing system, and disabling the analog TV signal output port using the signal output control interface;
   opening the analog TV signal output port by the DVD play device through the signal output control interface;
   driving a signal protection procedure when the DVD play device starts; and
   disabling of the analog TV signal output port by the DVD play device through the signal output control interface before the DVD play device finishes, followed by conclusion of the DVD session.

2. The method as claimed in claim 1 wherein the signal output control interface is a BIOS (Basic Input/Output System) interrupt of the computer system or a CMOS switch set up to control the analog TV signal output port according to predetermined procedures thereof.

3. The method as claimed in claim 1 wherein the signal protection procedure uses protection technologies provided by a VGA control device of the computer system.

4. A computer system for playing DVDs, comprising:
   a DVD play device to read and output data from the DVD;
   an image display control device to support a TV output function in the computer system, provide signal protection, and control displayed images;
   an analog TV signal output port; and
   a signal output control interface provided to the DVD play device to control the analog TV signal output port;
   wherein the analog TV signal output port is disabled by the signal output control interface when the computer system boots; the analog TV signal output port is opened by the DVD play device through the signal output control interface; the signal protection procedure is driven when the DVD play device starts; and the analog TV signal output port is disabled by the DVD play device through the signal output control interface before the DVD play device finishes, and the DVD session is concluded.

5. The system as claimed in claim 4 wherein the image display control device is a VGA control device and the signal protection procedure uses protection technologies provided by the VGA control device.

6. The system as claimed in claim 4 wherein the signal output control interface is a BIOS (Basic Input/Output System) interrupt of the computer system or a CMOS switch set up to control the analog TV signal output port according to predetermined procedures thereof.

* * * * *